US008918370B2

(12) United States Patent
Baker et al.

(10) Patent No.: US 8,918,370 B2
(45) Date of Patent: Dec. 23, 2014

(54) DYNAMIC ALLOCATION OF PROGRAM LIBRARIES

(75) Inventors: Christopher John Baker, Eastleigh (GB); Ian James Mitchell, Eastleigh (GB); Catherine Mary Moxey, Newbury (GB); Arthur James Neil, Winchester (GB); Jonathan Andrew Scott, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1795 days.

(21) Appl. No.: 12/055,477

(22) Filed: Mar. 26, 2008

(65) Prior Publication Data

US 2008/0243964 A1 Oct. 2, 2008

(30) Foreign Application Priority Data

Mar. 27, 2007 (EP) .................................... 07104963

(51) Int. Cl.
*G06F 17/30* (2006.01)
*G06F 9/445* (2006.01)

(52) U.S. Cl.
CPC .................................. *G06F 9/44521* (2013.01)
USPC .......................................................... 707/690

(58) Field of Classification Search
None
See application file for complete search history.

(56) References Cited

U.S. PATENT DOCUMENTS 6,698,015 B1 * 2/2004 Moberg et al. ................ 717/154
2007/0156856 A1 * 7/2007 Shafron ........................ 709/219

OTHER PUBLICATIONS

Setting the class path, Feb. 5, 2007, http://java.sun.com/javase/6/docs/technotes/tools/windows/classpath/htm, Pertinent pp. 5, Sun Microsystem.*

"Setting the Class Path", Synopsis XP-002480260, Sun Microsystems Homepage, URL:http://java.sun.com/javase/6/docs/technotes/tools/windows/classpath.html.

Richards, Hall Ed, et al. "A Policy-Driven Class Loader to Support Deployment in Extensible Frameworks", Component Deployment Lecture Notes in Computer Science; LNCS, Springer-Verlag, Be, vol. 3083, XP019006706, ISBN 978-3-540-22059-6, Jan. 1, 2004.

* cited by examiner

*Primary Examiner* — Syling Yen
(74) *Attorney, Agent, or Firm* — Steven L. Nichols; Van Cott, Bagley, Cornwall & McCarthy P.C.

(57) ABSTRACT

A method of dynamic allocation of program libraries to an application server is provided. In addition to a static allocation of libraries to the server at initialization time, libraries can be added to or removed from the set available to a server while that server is active. New libraries are created as resource objects specifying a set of locations from which programs can be loaded. Each library is allocated a ranking which the system can use to identify its place in the loader's search order relative to other libraries. New library resources are dynamically installed and added to a list of available libraries, including the system's pre-defined library of locations, in a position in the loader's search order determined in accordance with the allocated ranking.

23 Claims, 4 Drawing Sheets

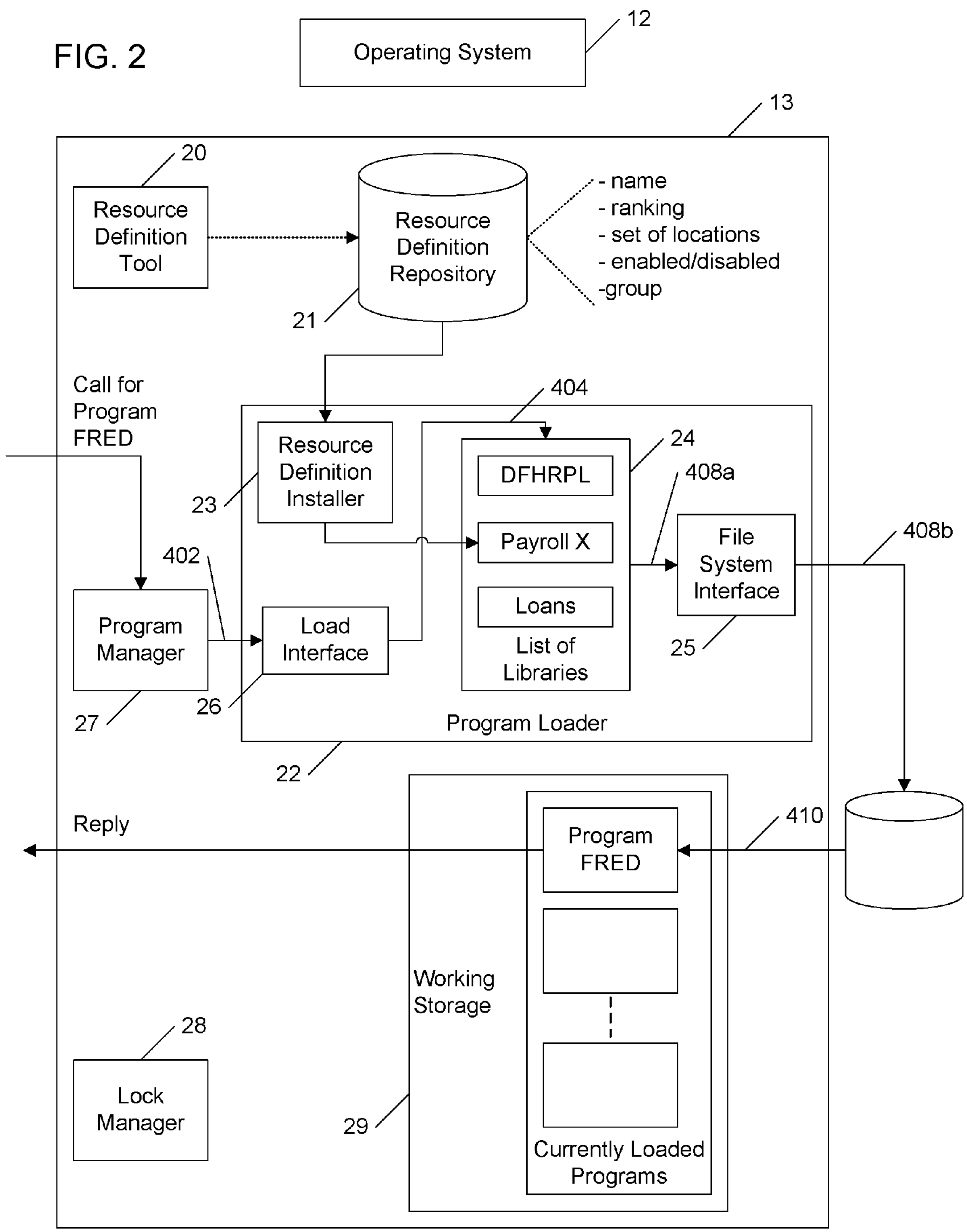
FIG. 2
Operating System
12
13
20
Resource Definition Tool
Resource Definition Repository
21
- name
- ranking
- set of locations
- enabled/disabled
-group
Call for Program FRED
404
Resource Definition Installer
23
24
DFHRPL
408a
Payroll X
408b
File System Interface
402
Loans
Program Manager
Load Interface
List of Libraries
25
27
26
Program Loader
22
Reply
410
Program FRED
Working Storage
28
Lock Manager
29
Currently Loaded Programs

DYNAMIC ALLOCATION OF PROGRAM LIBRARIES

BACKGROUND OF THE INVENTION

The present invention relates to the field of data processing and in particular to dynamically modifying the allocation of program libraries available to an application server.

An application server is a software engine that delivers applications to client applications. Defining the executable application resources available to an application server is a basic capability. How a server manages changes to the executable resources available to it can be a significant distinguishing feature. Typically, the executable resources exist in a file system made available to the server by the hosting operating system, and some mechanism is used to identify a subset of the file system where the server can find the resources it can load and execute. Such executable resources may include programs, functions, mapsets, partitionsets, subroutines, methods, procedures, modules or subprograms, and are hereinafter referred to collectively as 'programs'.

Many application servers statically define the set of locations within a file system in which programs can be found (in order to be loaded and executed as part of an application). Usually a program loader is provided with a specification of the location of directories containing such programs, rather than with the location of the individual programs themselves. This means that once such a specification is active it is possible to add or remove programs to those directories. The specification comprises an ordered list of locations, and when a program is to be found and loaded, the server runtime (program loader) will systematically search through the listed locations until the first instance of the requested program is found.

In some systems the ordered list of locations is defined as a search path which specifies an ordered list of file system directories in which to look for programs. In a JVM (Java® Virtual Machine) or a Java-based server, such as IBM®'s WebSphere® Application Server, the search order is defined by the classpath. In other systems, such as IBM's CICS® Transaction Server, the ordered list of locations is a list of file (dataset) names, which in CICS Transaction Server is called the DFHRPL DD (Data Definition) concatenation.

In each of these cases, the set of locations is predefined. They must exist when the server starts, and standard operating system mechanisms are used to specify them to the server at startup. Examples of such standard operating system mechanisms include JCL (Job Control Language) for IBM's z/OS® operating system or the classpath environment variable for Java-based servers.

Currently, there is no way for an administrator of such a server to change the set of locations that the server is to use, other than by modifying the pre-defined specification and restarting the server. Where 24×7 (continuous) operation is a high priority, this leads to a tension between a natural structure of program libraries that reflects the structure of the applications hosted in the servers, and a structure that supports the day-to-day operational needs of system programmers running the servers. For example, to accommodate fixes to the applications it is common to use a 'fixes' library at the head of the search order into which fixed programs can be added. Also, due to the static nature of the set of locations, it is easier and less disruptive to have a few directories and force all the applications into them than to have an extensive list of application-specific directories.

BRIEF SUMMARY OF THE INVENTION

The present invention may be embodied as a method of dynamically modifying the set of locations available to an application server from which programs may be loaded. A ranking is allocated to a predefined library to identify a set of locations from which programs may be loaded. A new library resource is created specifying a set of new locations from which programs may be loaded and a ranking is allocated to the library resource. The new library resource is dynamically installed by adding it to the existing list of installed libraries that includes the predefined library. A search order for the installed libraries is determined based on their allocated rankings.

The invention may also be implemented as a program loader for an application server. The program loader includes a list of one or more program libraries, each having a search position identifying an order in which to search through the libraries for a requested program. The program loader also includes a resource installer for receiving a new resource definition relating to a new program library. The new resource definition identifies a set of one or more locations of programs and a ranking of the new library resource. The resource installer adds the new library resource to its list of program libraries and allocates a search position to the new library resource in accordance with its allocated ranking.

The invention may also be implemented as an application server that includes a resource definition repository for storing resource definitions and a user interface that enables creation of new library resource definitions specifying a set of locations from which programs may be loaded and including a ranking. The application server further includes a program loader that receives the new library resource definition, a table that identifies the set of installed libraries and a search order the program loader follows in searching for locations from which to load requested programs. The program loader responds to receipt of the new library resource definition by updating the table to identify the position of the new library resource in the search order.

The invention may also be implemented as a computer program product for dynamically modifying the set of locations from which programs may be loaded to an application server. The computer program product includes a computer usable medium embodying computer usable program code configured to allocate a ranking to a predefined library identifying a set of locations from which programs may be loaded, to create a new library resource specifying a set of new locations from which programs may be loaded, to allocate a ranking to the new library resource, and to dynamically install the new library resource by adding it to the existing list of installed libraries and determining a search order for the new list of installed libraries as a function of their respective allocated rankings.

BRIEF DESCRIPTION OF THE SEVERAL VIEWS OF THE DRAWINGS

FIG. 2 shows components that may be used to implement the invention.

DETAILED DESCRIPTION OF THE INVENTION

Figure 1:
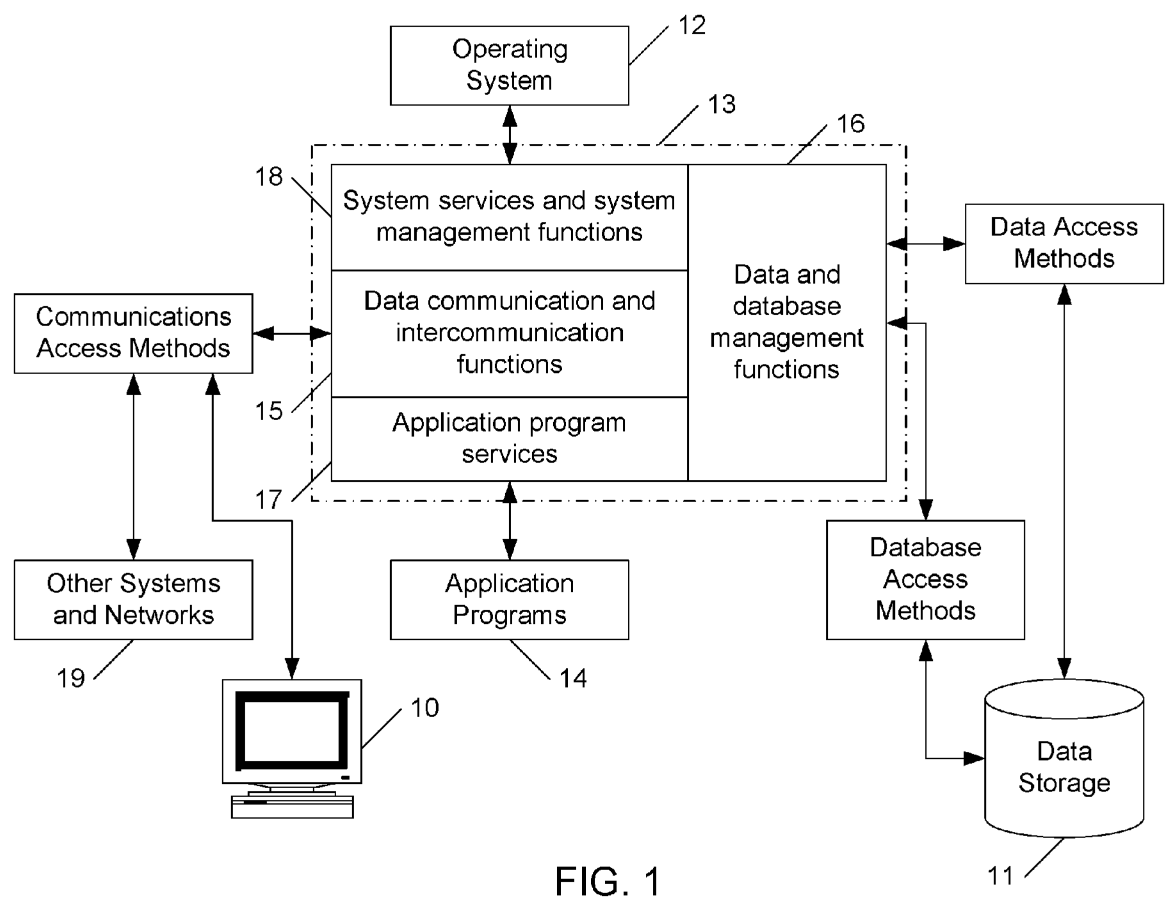
FIG. 1 is an overview of a transaction processing system suitable for implementation of a method according to the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In one embodiment, the present invention is implemented in general purpose online transaction processing (OLTP) software, one example of which is IBM's CICS, a powerful application server that provides comprehensive client/server support and application services.

FIG. 1 shows a transaction processing system including associated hardware and software. The hardware includes terminals such as 10 and databases and files such as 11. A host computer operating system 12, examples of which are IBM's MVS or z/OS operating systems, supplies general data processing services to transaction processing software 13. The transaction processing software may be regarded as a subsidiary operating system, or application server, which provides specialized online services to provide an environment for execution of online application programs 14, typically written by a customer for a specific online transaction processing application.

Application programs give users online access to their data and the ability to send messages to other transaction processing software users. In addition, application programs running under the transaction processing software can communicate with other programs running elsewhere in the same computer system or with other computing systems 19.

The transaction processing software 13 includes data communication functions 15 that provide an interface between the transaction processing software and local or remote terminals to make the input or output of data easier. They provide a degree of device independence and format independence for application programs. There are also multi-region operation (MRO) and intersystem communication (ISC) facilities. Data handling functions 16 provide an interface between the transaction processing software and stored data 11. They allow the data to be read or updated, while preventing unauthorized access and protecting the data from corruption. The transaction processing software has interfaces to database products and to standard file access methods. The transaction processing software also has routines to handle queues and scratchpad data used within the transaction processing software itself. Application program services 17 provide an interface between the transaction processing software and the application programs 14. System services 18 provide an interface between the transaction processing software and the operating system 12. System services 18 include functions to control the transaction processing software and to share resources.

Application programs are usually stored on a direct access storage device (DASD) from which they can be loaded when the system is started or as required. The existing mechanism for locating and loading programs uses a static definition of the set of locations, called a Relocatable Program Library or DFHRPL. The startup JCL includes a JCL statement that defines the dataset contents of DFHRPL. On startup, the operating system logically concatenates the set of data sets in a specified order to produce a DFHRPL DD concatenation which the loader can open and lookup. When a request is made to locate a file in DFHRPL, the loader searches the listed data sets in the order they are named in the JCL.

In addition to this pre-defined library of data sets, the present invention allows libraries to be added as DD statements while the server is active. Libraries may also be removed from the set available to the server. Each library is allocated a ranking which the system can use to identify its place in the search order relative to other libraries.

The system allows the definition of a new type of resource, a library resource, which can be dynamically added during runtime to the set of locations that were allocated to the server at startup (in the predefined DFHRPL library). The library resource is given a 'ranking' attribute that can be used by the program loader to determine the location of the new 'dynamic' library relative to the predefined DFHRPL library as well as relative to other dynamic libraries that may have been created.

The program loader is implemented to interface with the resource definition mechanism such that installation of a library resource results in the program loader adding the library resource to a list of installed libraries and to allocate a search value to the new library resource which identifies the position of the new library in the search order through which the libraries should be searched for a program. Each new library resource is an object that can be managed and controlled in all the usual ways.

One embodiment of the present invention will now be explained in further detail with reference to FIG. 2, which shows the main components, as well as the process flows involved in adding a new library and calling a program. The system includes a resource definition tool 20 for enabling a user to define a new library resource, a resource definition repository 21, a program loader 22, a program manager 27, a lock manager 28 and working storage 29.

The resource definition tool 20 may be a modified version of an existing administrative interface such as Resource Definition Online (RDO) or Business Application Services included in CICS, through which authorized users may dynamically create resources. One example of a suitable resource definition repository is the CICS System Definition dataset (CSD).

The program manager receives commands to link to, transfer control to or load a program. The program manager determines if the program is already in the working storage 29, where a set of currently loaded programs resides. If the program is not found in working storage, the program manager instructs the program loader to load the requested program. If a program is in storage and is not being used, the system can release the space for other purposes. When the program is next started, a fresh copy will be loaded by the program loader.

The program loader 22 comprises a resource definition installer 23 for installing new library resource definitions, a list 24 of available program libraries, a load interface 26 for receiving load commands, and a file system interface 25 for interfacing with the data storage that contains the programs. The list of available program libraries includes the predefined DFHRPL library as well as any dynamically installed libraries, as will be explained in more detail below.

To add a new 'dynamic' library, an administrator creates a new library resource using the resource definition tool. The resource definition tool adds the new definition to the resource definition repository 21. The definition includes the name of the library and specifies a set of one or more datasets from which programs may be loaded, as well as a ranking value associated with the new library resource and which indicates the location which the new library is to take in the program loader's search order. The definition of a new library resource may also include the name of a group to which the library resource belongs and an attribute identifying its status as either enabled or disabled. These attributes will be explained in more detail later.

The group name is used by the resource definition repository, in this embodiment the CSD file, which is organized into groups and lists of groups. The main purpose of the group is to provide a convenient method of collecting related resources together on the CSD file. As will be explained later, the group name may also be used to restore a resource definition on restart of the server.

The administrator then instructs the system to install the new library resource. Information about the new resource is used to construct the data structures that represent the resource in the address space. The program loader is sent the new library resource definition which is received by its resource definition installer. This component locates and opens the data sets specified in the new resource and concatenates these datasets into a new DD concatenation. The loader adds this new DD concatenation to its table 24 of available libraries (which are also listed as DD concatenations) and updates a search order indicating the order in which the libraries should be searched. If DFHRPL is the only library, that is, no dynamic libraries have yet been installed, then the set of libraries and the search order each contains only one member. Note that the order of searching through the datasets within each library is already determined by the DD concatenation. The search order is determined by comparing the relative ranking attributes of the libraries. By way of example, suppose the DFHRPL library is allocated a ranking value of 10. A library resource with a ranking value of less than ten will be listed before the DFHRPL library in the loader's search order, whereas a library resource with a ranking value of ten or more may be listed after the DFHRPL library. If two libraries have the same ranking value, then some other factor is used to determine which comes first in the search order, such as which has existed longer.

For the dynamically defined library resources, the ranking values can be changed, and new library resources can be defined and activated at any time, so the algorithm that finds and loads programs must be aware at all times of the current positions of all the libraries in the search order. Because the search order can be changed at any time, serialization is needed to ensure that programs are loaded only from the first location in the currently active search order in which they appear. A locking scheme is used to ensure that no load request is allowed to proceed when the search order is being modified or is in an intermediate state. The mechanism for doing this involves the loader acquiring an exclusive lock on the current ordered list of active libraries when a change is taking place that will affect that list, and a shared lock whenever the list is being used to find and load programs. These locks are managed by the lock manager 28.

Once the new DD concatenation has been created, it is made available upon release of the exclusive lock and is then available for program search and loading operations, avoiding the need for a restart.

Dynamic library resources can be used to manage particular applications by defining the data sets from which a particular application's program components are to be loaded. Consider a payroll application comprising a number of components such as a core, several data-access routines and a UT component. A library definition can be used for these Payroll components to distinguish them from equivalent ones for other applications, e.g., "Warehouse" or "Loans" applications.

Figure 3:
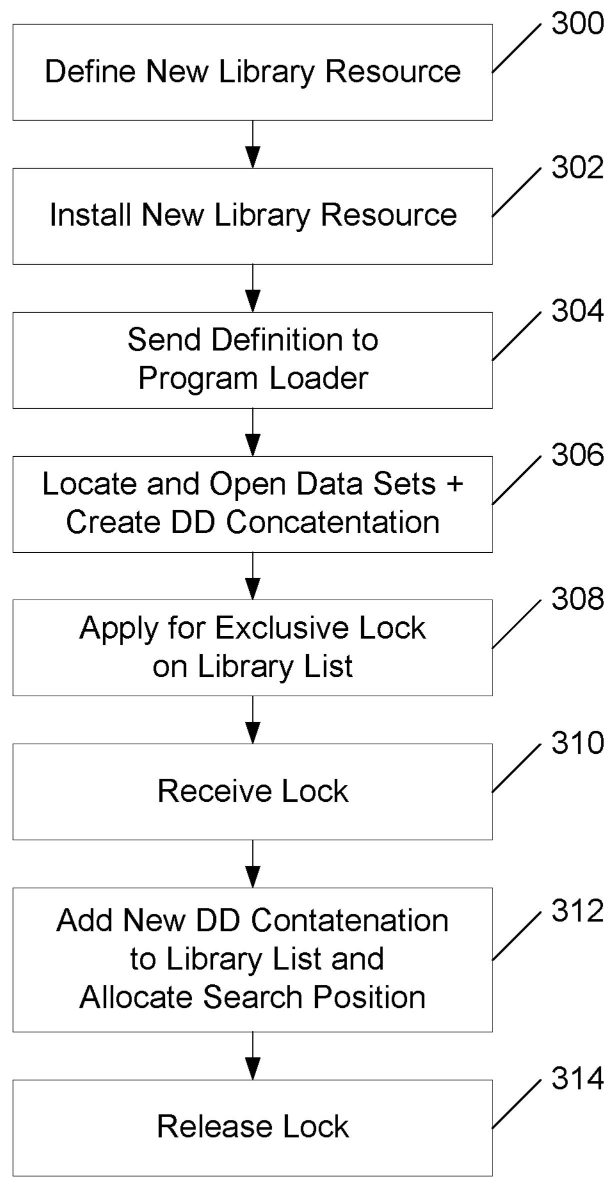
FIG. 3 shows steps involved in adding a new library according to one embodiment of the invention.

As an example, an administrator may use the resource definition tool 20 to define (operation 300 in FIG. 3) a new library resource having the following attributes:

| | |
|---|---|
| Name: | Payroll |
| Ranking: | 20 |
| Set of Datasets: | {payroll-core, payroll-data, payroll-UI} |
| Enabled: | Yes |
| Group: | USERDEF |

The new library resource 'Payroll' must then be installed (operation 302). This results in the new resource definition being sent (operation 304) to the resource definition installer 23 of the program loader. The installer locates and opens the set of payroll datasets and concatenates the datasets (operation 306) into a DD concatenation.

The program loader then applies (operation 308) to the lock manager 28 for an exclusive lock which will prevent any other job from reading the library list 24 while it is being changed.

Suppose the following two dynamic libraries have already been installed:

| | |
|---|---|
| Name: | Warehouse |
| Ranking: | 40 |
| Set of Datasets: | {warehouse-core, warehouse-data, warehouse-UI} |
| Enabled: | No |
| Group: | USERDEF |
| Name: | Loans |
| Ranking: | 50 |
| Set of Datasets: | {loans-core, loans-data, loans-UI} |
| Enabled: | Yes |
| Group: | USERDEF |

The loader's current list of available libraries may specify:

| LIBRARY | RANKING | SEARCH POSITION |
|---|---|---|
| DFHRPL | 10 | 1 |
| Warehouse | 40 | — (because its status is Disabled) |
| Loans | 50 | 2 |

Now the program loader will add the Payroll library to this list. The loader determines where in the search order the new library should be added by comparing the ranking value of the new library with the ranking values of the other libraries. The DFHRPL is typically assigned a ranking value of 10 and thus the new library Payroll, having a ranking value of 20, will be given a search position of 2, that is, after the statically allocated library. The search position of the Loans library will be updated to a value of 3, such that it is searched only after the Payroll library.

When the loader has updated (operation 312) its list, it releases (operation 314) the exclusive lock on the list. The new library is thus available to the server for processing new job requests.

Figure 4:
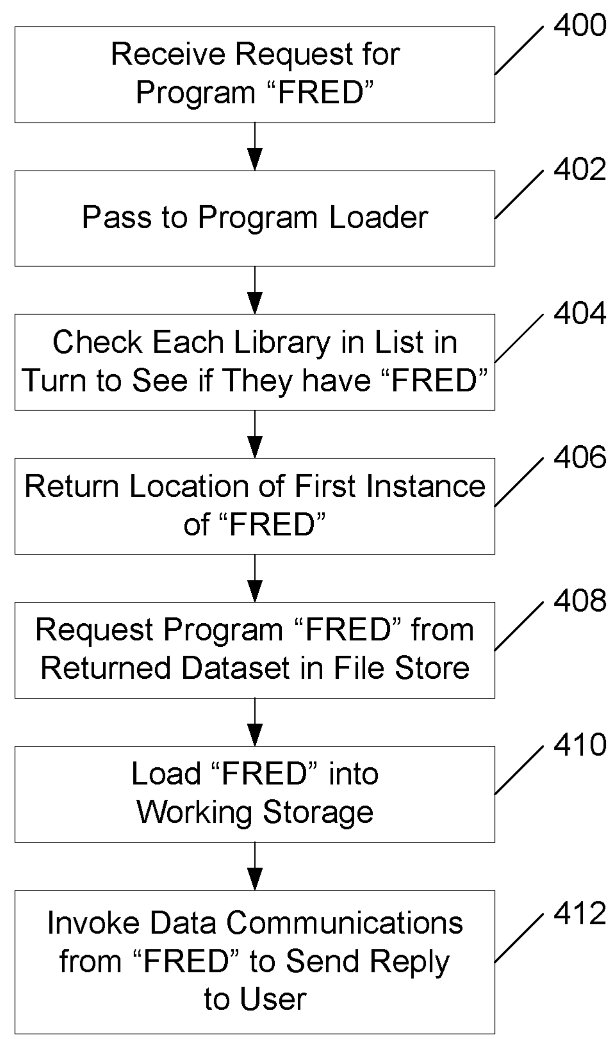
FIG. 4 shows process flows in a load operation according to one embodiment of the invention.

The processing of a program call will now be discussed with reference to FIGS. 2 and 4. Suppose a new program call is received (operation 400) by the program manager 27 for the program 'Fred'. If program Fred is not already in working storage 29 or the request is for a new copy of Fred to be loaded, then the program manager passes (operation 402) the request to the program loader. In response to receipt of this request, the program manager searches through its libraries. It begins with the library at the top of its search order, that is, having a search position value of 1. The loader will check whether any of the datasets in that first library contain the program 'Fred'. If not, then the loader moves on to the next library in the search order until the first instance of a dataset containing the program Fred is found. The location of this instance is returned (operation 406); e.g. Dataset: 'Payroll-Core'. A request to load program Fred from this dataset is made (operation 408) to the file system via the file system interface (408*a*, 408*b*). Note there may be other datasets later on in the search order which also contain the program Fred, but which will not be used. Program Fred is then loaded (operation 410) from the returned dataset into working storage where a task is created and program Fred is given control on its behalf. Fred may invoke (operation 412) a process to send a particular reply to the requester.

Certain operations on the underlying data sets represented by a library may require the data sets to be quiesced and program loading activity suspended (for example, space management operations). Thus it is useful to provide the ability to disable a library and its data sets within the search order without actually removing it from the set of installed data sets. As has been explained above, a data set belonging to a disabled library is ignored during a search for a particular program, for example, through the allocation of a predefined search position value, e.g. a null value, to any disabled library resource.

It will be appreciated that it may be necessary to provide security controls over who can create new library resources. In one embodiment, existing security mechanisms that control the definition of resources and the issuing of commands which operate on those resources can be used.

Preferably, for most applications, new 'dynamic' libraries will continue to be specified dynamically via the new mechanism when a restart occurs, rather than 'hardening' them into the server's statically allocated 'pre-defined' library. The invention provides a means of persisting the changes made to the locations used by the server. The defined libraries are persistent application resource objects that can be restored, when the system is restarted, using existing mechanisms for the management of application resources.

Installed resource definitions are recorded in a transaction processing software catalog. An active server's current configuration, that might have been subject to change by adding or removing dynamic library specifications, will be maintained across the restart and recovery process for the server, or could be reset if the server is reinitialized by so-called 'cold starting'.

On restart via so-called 'initial' or 'cold' starts, the transaction processing software installs resources belonging to groups whose names appear on particular startup lists held in the CSD file. An administrator can ensure that a new library resource will be installed at an initial or cold start by selecting a group name that is already on a startup list, or by adding the group name to a startup list.

The present invention provides a mechanism whereby a set of locations from which programs can be loaded can be dynamically added into or removed from the application server, thus allowing the overall set of locations that will be used to be changed while the server is running. It is also possible to change the relative search order of the libraries, and even to insert dynamic library definitions into the search order ahead of the static definition.

The present invention also allows program load requests to be honored with minimal disruption while a configuration change is being made that might affect the library containing the program. Transaction processing software can use operations to manage the consistency between the running application and the libraries.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of dynamically modifying the set of locations available to an application server from which programs may be loaded, the method comprising:

allocating a ranking to a predefined library identifying a set of locations from which programs may be loaded;

creating a new library resource specifying a set of one or more locations from which the application server may load programs;

allocating a ranking to the new library resource; and dynamically installing the new library resource without restarting the application server, including adding the new library resource to a list of installed libraries including the predefined library and determining a search order of the installed libraries as a function of their respective allocated rankings.

2. A method according to claim 1, comprising allocating a search value to the new library resource, the search value representing the position of the library in the search order.

3. A method according to claim 2, further comprising updating a search value allocated to one or more other installed libraries to reflect any change to their position in the search order caused by the addition of the new library resource.

4. A method according to claim 3, further comprising allocating a predefined search value to disabled library resources, such that the search order excludes such disabled library resources.

5. A method according to claim 4, wherein dynamically installing the new library resource comprises acquiring an exclusive lock on the list of libraries.

6. A method according to claim 5, further comprising responding to the receipt of a load request for a requested program by searching the libraries for the location of the first instance of the requested program in accordance with the determined search order.

7. A method according to claim 6, further comprising returning the location of the first instance of the requested program.

8. A method according to claim 7, further comprising loading the requested program from the returned location.

9. A program loader for an application server comprising software stored on a computer-usable storage medium, the program loader comprising:

a list of one or more program libraries, each having a search position identifying an order in which to search the program libraries for a program; and a resource installer for receiving a new library resource definition relating to a new program library, said new library resource definition identifying a set of one or more locations of programs and a ranking of the new library resource, and in response to receiving said new library resource definition, adding the new library resource to the list of program libraries, and determining a search position of the new library resource in accordance with its allocated ranking.

10. A program loader according to claim 9, wherein said resource installer further updates the search position of other libraries in the list to reflect any change in their search position caused by the addition of the new library resource.

11. A program loader according to claim 9, wherein said resource installer further allocates a null search value to a disabled library resource, such that the search order excludes the disabled library resource.

12. A program loader according to claim 11, wherein said resource installer further acquires an exclusive lock on the list of libraries before making modifications thereto.

13. An application server comprising software stored on a computer-usable storage medium, the application server comprising:

a resource definition repository for storing resource definitions, a user interface for enabling the creation of a new library resource definition specifying a set of locations from which programs may be loaded and a ranking of the new library resource, a program loader having a resource definition installer for receiving a new resource definition on installation of said new resource; and a table identifying the set and search order of installed libraries through which the program loader searches for locations from which to load requested programs, the program loader being responsive to receipt of said new library resource definition to update the table to identifying the position of the new library resource in the search order without restarting the application server.

14. An application server according to claim 13, further comprising a predefined library identifying a set of locations from which programs may be loaded, and wherein the table identifies the predefined library as well as any installed library resources defined in the resource definition repository.

15. An application server according to claim 14, further comprising a lock manager for managing a locking scheme to block requests to read the table while the table is being updated.

16. A computer program product for dynamically modifying the set of locations available to an application server from which programs may be loaded, said computer program product comprising a computer usable storage medium having computer usable program code embodied therewith, said computer usable program code comprising:

computer usable program code configured to allocate a ranking to a predefined library identifying a set of locations from which programs may be loaded;

computer usable program code configured to create a new library resource specifying a set of one or more locations from which the application server may load programs;

computer usable program code configured to allocate a ranking to the new library resource; and computer usable program code configured to dynamically install the new library resource without restarting said application server, including adding the new library resource to a list of installed libraries including the predefined library and determining a search order of the installed libraries as a function of their respective allocated rankings.

17. A computer program product according to claim 16 further comprising computer usable program code configured to allocate a search value to the new library resource, the search value representing the position of the library in the search order.

18. A computer program product according to claim 17 further comprising computer usable program code configured to update a search value allocated to one or more other installed libraries to reflect any change to their position in the search order caused by the addition of the new library resource.

19. A computer program product according to claim 18 further comprising computer usable program code configured to allocate a predefined search value to disabled library resources, such that the search order omits such library resources.

20. A computer program product according to claim 19 wherein said computer usable program code configured to dynamically install the new library resource further comprises computer usable program code configured to acquire an exclusive lock on the list of libraries.

21. A computer program product according to claim 19 further comprising computer usable program code configured to respond to the receipt of a load request for a requested program by searching the libraries for the location of the first instance of the requested program in accordance with the determined search order.

22. A computer program product according to claim 21, further comprising computer usable program code configured to return the location of the first instance of the requested program.

23. A computer program product according to claim 22, further comprising computer usable program code configured to load the requested program from the returned location.

* * * * *